June 26, 1956  J. MULLER  2,752,001
FILTER FOR GASEOUS FLUIDS

Filed Nov. 25, 1953  2 Sheets-Sheet 1

INVENTOR
JACQUES MULLER

BY Young, Emery & Thompson
ATTORNEYS

June 26, 1956  J. MULLER  2,752,001
FILTER FOR GASEOUS FLUIDS
Filed Nov. 25, 1953  2 Sheets-Sheet 2

INVENTOR
JACQUES MULLER

BY Young, Emery & Thompson
ATTORNEYS

United States Patent Office 2,752,001
Patented June 26, 1956

2,752,001

FILTER FOR GASEOUS FLUIDS

Jacques Muller, La Garenne-Colombes, France

Application November 25, 1953, Serial No. 394,416

Claims priority, application France November 27, 1952

10 Claims. (Cl. 183—15)

This invention relates to filters for gaseous fluids for use in motors, compressors, and other engines, particularly heat engines, and other machines in which gaseous fluids are used or passed through, to prevent penetration thereinto of solid impurities such as dust, sand, etc. acting abrasively with resulting premature wear of parts of such engines or machines.

Filters for such engines working in a dust laden atmosphere must not only assure perfect filtering, but must also be designed to permit easy and rapid cleaning.

The object of the present invention is to provide a filter of this kind in which the filter elements consist of annular coil springs with or without a rigid core, similar to coiled wire bracelets formed of wire wound in helical coils, several of said annular coil springs being disposed concentrically in each filtering cell, with the convolutions of the coils closer together in the direction of travel of the fluid to be filtered.

A certain number of cells are assembled coaxially in an independent block which is inserted between a plate rigidly carried by the air intake conduit and a cap covering this block and the plate, sealing being maintained by at least one or more elastic members capable of easy removal and replacement whereby the dismounting and the reassembly of the said block between the plate and cap can be effected rapidly, without use of tools, and by a very simple operation.

Other objects of the invention will appear hereinafter in the description of the invention and in the illustration of the invention in the accompanying drawings, in which.

Figure 1:
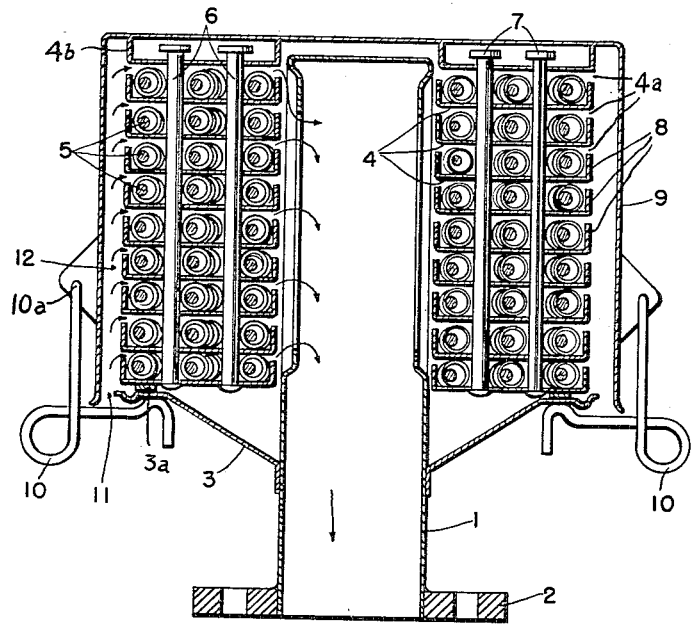
Figure 1 is an axial sectional view of a filter according to the present invention of the dry type.

The filter shown in Fig. 1 comprises a tube 1 provided at its lower end, assuming the filter to be upright, with a coupling flange 2 for connection to the intake conduit of an internal combustion engine. The upper portion of this tube 1 is slotted or perforated over a part of its length and at several places in its circumference. An annular conical plate 3 is fixed on the tube 1 at a certain distance from the flange 2, on which plate is supported by means of an annular gasket 3a a filter block consisting of a stack of solid annular discs 4 between which are disposed annular coil springs or bracelets 5 formed of a metal wire wound into helical coils. The spaces between the discs 4 form the filter cells, each of which contains several concentric annular coil springs which are thus arranged in series. In this form of construction, the convolutions of the helical coils are closer and closer together in the direction of the axis of the filter since the filtering is to take place from the outside towards the interior, that is, towards the central tube 1. In other words, the convolutions of the outer annular coil spring are spaced apart the greatest distance, those of the intermediate annular coil spring a lesser distance and those of the inner annular coil spring the smallest distance. If the fluid to be filtered is to flow radially outwardly, then the inner annular coil spring would have its convolutions spaced apart the greatest distance, and the outer annular coil spring would have the most closely spaced convolutions.

The discs of the block are held assembled by rods 6 parallel to the axis of the tube 1 and passing freely through holes formed for this purpose in the discs. These rods have heads 7 at both ends, forming stops. They are of such length that it is possible to separate the discs slightly from each other when the block is removed. They are arranged in circular concentric rows and the rods in each row pass between two consecutive annular coil springs to hold them spaced and concentric.

All the discs 4 may be provided at their internal and external peripheries with axially extending rims 8 of a height less than the thickness of the annular coil springs to provide between the discs 4 and the edges of the rims 8 peripheral slots 4a for the passage of the fluid. The assembled block, of a height slightly greater than that of the tube 1 above the plate 3, is covered by a cap 9 having a skirt extending slightly below the periphery of the plate. Elbowed resilient clamps 10 are pivotally mounted at 10a on the outside of said skirt in such a manner that they bear against the lower face of the plate 3 and draw the cap downwardly which thus exerts a downward pressure on the uppermost disc 4b of the block. The block is thus clamped between the bottom of the cap and the plate 3 and the annular coil springs 5 are clamped between the successive discs 4 and 4b. Due to the distance of the peripheral slots 4a the annular coil springs 5 are compressed and held in position between discs 4 and 4b when the cap 9 is drawn downwardly by means of the resilient clamps 10. Between the periphery of the plate and the skirt of the cap there is provided an annular gap 11 for the passage of the fluid to be filtered.

The operation is as follows:

When the flange of the tube 1 is connected to the intake conduit of an internal combustion engine, for example, the external air is drawn in through the gap 11 in the direction of the arrow and spreads or diffuses in the annular chamber 12 provided between the circumference of the block and the skirt of the cap 9. This chamber distributes the drawn-in air which passes through the peripheral slots 4a between the rims 8 and the adjacent discs into the filter cells which it traverses radially towards the tube 1. The convolutions of the outer toroidal annular coil spring of each cell are spaced from each other so as to hold back only the coarsest dust particles. The convolutions of the next toroidal coil spring are spaced to arrest smaller particles. Finally, the convolutions of the innermost toroidal spring are spaced to arrest the finest particles. There is thus obtained a segregation or distribution of dust deposits on consecutive toroidal coil springs which retards warping or clogging.

While three annular coil springs have been shown between each pair of discs, it should be understood that any desired number of annular coil springs may be used.

To clean the filter, the elastic clasps or clamps 10 are unhooked, the cap 9 removed, and the block assembly withdrawn from the tube 1. Since the length of the rods 6 is slightly greater than the overall height of the block, it is possible to separate the discs 4 slightly from each other facilitating cleaning by rinsing or otherwise.

Figure 2:
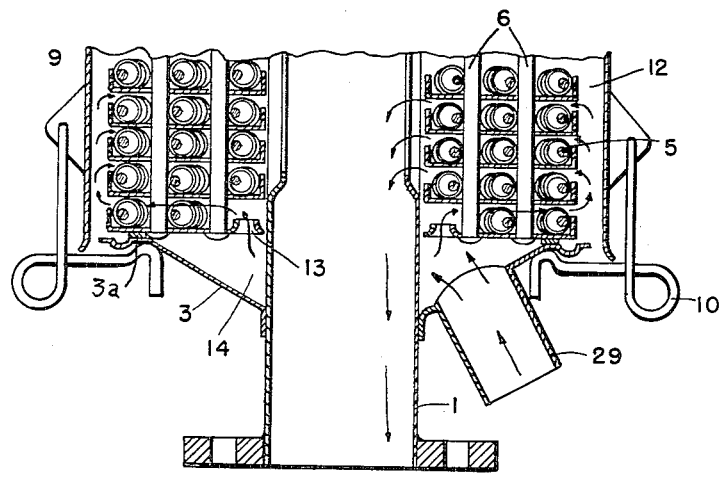
Fig. 2 is a partial axial sectional view of a modified form of filter.

The filter shown in Fig. 2 is similar to that of Fig. 1 except that the plate 3 is provided with a pipe connection 29 for attachment to the crank case vent (not shown) of an internal combustion engine, and the last disc at the bottom of the filter block is provided with an annularly arranged series of openings or orifices 13.

It is known that the crank case vent provides for evacuation of oil vapors released in the engine crank case. In the embodiment shown in Fig. 2, these oil vapors diffuse or flow into an annular chamber 14 formed between the plate 3, the tube 1, and the lower disc of the block. These vapors then pass through the holes 13 into the first cell at the bottom which does not communicate with the interior of the tube 1. This cell allows the vapors to escape through the slot at its outer periphery, into annular chamber 12, so that they are entrained by the drawn air current and pass along with it through some of the lower cells of the block, to enter the intake conduit of the engine.

Figure 3:
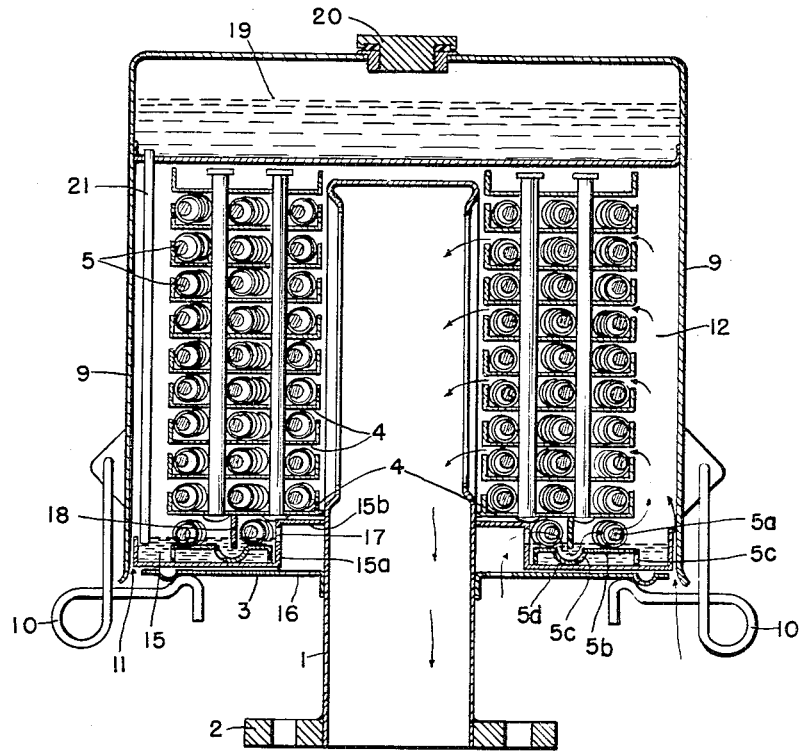
Fig. 3 is an axial sectional view of a further modified form of filter provided with an oil bath.

In the embodiment shown in Fig. 3, the plate 3 carried by the tube 1 supports an annular vat or tray 15. The central annular vertical wall 15a of the tray is of a greater height than the outer wall and is provided with an inwardly extending horizontal flange 15b. The filter block surrounding tube 1 rests on flange 15b. The plate 3 has formed therein near the tube 1 a circular row of holes 16 and other holes 17 are formed in the wall 15a. The lower face of the first disc 4 of the filter block has depending therefrom an annular baffle 18. The annular tray 15 contains a constant level oil bath and the length of the baffle 18 is such that it dips below the surface of the oil bath. Under these conditions, the operation is as follows:

The major part of the air drawn in by the engine passes through the annular slot 11 between the plate 3 and the skirt of the cap 9, but this slot is so dimensioned that the suction of the engine produces a depression in the annular chamber 12 surrounding the filter block, due to which depression an amount of secondary air is drawn through the annular cell formed between the lowermost disc of the block and the tray 15 containing the oil bath. The baffle 18 compels this air to bubble through the oil so that a certain amount of vapor is formed. The mixture of secondary air and oil vapor issuing from the peripheral slot of the tray 15 is entrained by the current of primary air entering by the slot 11 and the oil vapor is then used to contribute to the moistening of the annular coil springs 5 and the lubrication of the parts of the engine in the upper parts of the cylinders in the manner hereinbefore described.

In some instances, it may be desirable to incorporate annular coil springs 5a between the lowermost disc 4 and the oil bath in the tray. For this purpose, supports 5b are provided in the tray. It will be noted that portions of the supports in the oil bath are provided with apertures 5c to avoid any restriction of the flow of oil in the tray 15. Also, a suitable depression 5d is provided to enable the air to flow through the oil under the baffle 18.

This device is useful in air compressors and like machines, and in engines, especially two-cycle engines in which the crank case functions as a feed pump.

The level of the oil bath in the tray 15 is kept constant by means provided in the cap 9, which for this purpose comprises at its upper end an oil reservoir 19 closed by a sealed plug 20. This reservoir has a siphon tube 21, the length of which is such that when the cap 9 is clamped on the filter block by the resilient clamps 10, the lower end of the siphon is located at the level desired for the oil bath. If this level falls due to oil evaporation, air can enter the siphon and then into the reservoir, which produces a corresponding flow of oil from the reservoir until the desired level in the tray is re-established.

Figure 4:
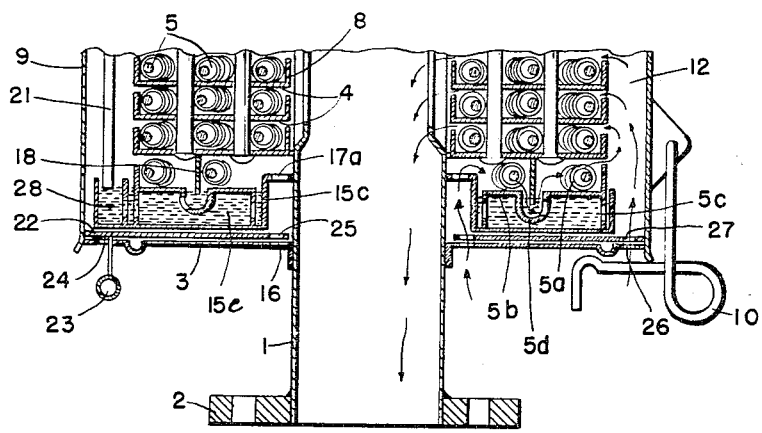
Fig. 4 is a partial axial sectional view of a still further modified form of filter including an oil bath.

The moist filter may be provided also with means for regulating the cross-section of the holes 16 available for air flow. Fig. 4 shows such a construction. Between the plate 3 on the tube 1 and the tray 15c containing the oil bath is inserted an annular disc 22, rotatably adjustable by means of a handle 23 thereon which projects below the plate 3 through an arcuate slot 24 formed therein. Near its inner periphery the disc 22 is perforated by a series of holes 25 arranged in a circular row, and of a number equal to the number of the holes 16 in the plate 3. By moving the handle 23 along the arcuate slot 24, the holes 25 in the adjustable disc can be made to register more or less with the holes 16 in the plate 3 so as to regulate the entry of the secondary air and consequently, the amount of oil vapor which it will entrain.

Instead of the gap 11 it is also possible to provide coincident circular rows of holes 26 and 27 near the outer peripheries of the plate 3 and disc 22, permitting regulation of the flow cross section for the primary air as a function of that for the secondary air.

To reduce turbulence in the tray 15 by the descent of the oil column in the siphon 21, this may discharge in a cup 28 integral with the tray and communicating therewith through orifices adapted to distribute the oil progressively.

What I claim is:

1. A filter for gaseous fluids, for use in motors, compressors, and similar engines, comprising a filter block consisting of a plurality of axially spaced coaxial annular discs, a plurality of concentric annular filter units in the form of toroidal coil springs positioned between pairs of said plates, the convolutions of said toroidal coils between a pair of plates being closer together from one toroidal coil spring to another in the direction of flow of fluid to be filtered, a central slotted tube on which said block is mounted, a circular plate fast on said tube for supporting said block, a cap covering the assembly, and elastic clasps pivoted externally on the skirt of the cap and bearing on the lower face of the plate for clamping the block against the plate.

2. A filter according to claim 1 in which the cap has an internal diameter greater than the external diameter of the discs to provide an annular space between the cap and discs for distributing fluid to be filtered to the coils between the discs, and in which the plate is of a diameter less than the internal diameter of the cap to provide an air intake slot between the plate and cap.

3. A filter according to claim 1 in which the discs are provided with a plurality of holes intermediate the inner and outer portions thereof, and further comprising a plurality of rods extending parallel to the axis of the discs and passing loosely through said holes, heads on the ends of said rods, said heads being of dimension greater than the size of the holes to retain the rods, discs and toroidal coil springs in assembled relation, and the effective lengths of the rods being greater than the overall length of the assembled discs and toroidal coil springs to enable the discs to axially separate to a limited extent to facilitate cleaning.

4. A filter according to claim 1 in which the discs are provided at their inner and outer peripheries with axially extending tubular rims of a height less than the thickness of the toroidal coil springs.

5. A filter according to claim 1 in which the central portion of the plate is formed to provide a chamber, the lowermost disc is perforated to provide communication between the chamber and the lowermost cell in the block, and further comprising means to connect the chamber with the crankcase vent of an engine.

6. A filter according to claim 1 in which an annular vat is provided on the plate beneath the lowest disc of the block, said plate having a series of openings adjacent its innermost portion for the flow of air from the exterior of said vat to the annular chamber between the block and the cap, and means for supplying and maintaining a constant level of oil in said vat.

7. A filter according to claim 6 further comprising an annular baffle carried by the lowermost disc and extending downwardly into said vat beneath the surface of the oil maintained therein to effect contact of air passing over the oil surface with the oil.

8. A filter according to claim 1 in which an annular vat is provided on the plate beneath the lowest disc of the block, said plate having a series of openings adjacent its innermost portion for the flow of air from the exterior of said vat to the annular chamber between the block and the cap, and means for supplying and maintaining a constant level of oil in said vat including a sealed oil reservoir carried in said cap above the block and a siphon tube connected with said reservoir and having an open end extending into the vat at a point determining the level of oil in the vat.

9. A filter according to claim 8 in which the vat has a separate compartment into which the lower end of the siphon tube extends, said compartment communicating with the vat through restricted orifices.

10. A filter according to claim 1 in which an annular vat is provided on the plate beneath the lowest disc of the block, said plate having a series of openings adjacent its innermost portion for the flow of air from the exterior of said vat to the annular chamber between the block and the cap, means for supplying and maintaining a constant level of oil in said vat, a second plate contacting the first-mentioned plate and rotatably mounted with respect thereto, said second plate having a series of openings corresponding to the openings in the first plate, and means for rotating the second plate to vary the register between the openings in the two plates.

References Cited in the file of this patent

UNITED STATES PATENTS

| | | |
|---|---|---|
| 2,332,110 | Podbielniak | Oct. 19, 1943 |

FOREIGN PATENTS

| | | |
|---|---|---|
| 579,475 | Great Britain | Aug. 6, 1946 |
| 599,643 | France | Jan. 16, 1926 |
| 670,907 | France | Dec. 6, 1929 |